United States Patent [19]

Markle

[11] Patent Number: 4,812,521

[45] Date of Patent: Mar. 14, 1989

[54] EPOXY RESINS MODIFIED WITH N-R-[(OXY OR THIO)METHYL]ACRYLAMIDE TERPOLYMERS

[75] Inventor: Richard A. Markle, Columbus, Ohio

[73] Assignee: Eagle-Picher Industries, Inc., Cincinnati, Ohio

[21] Appl. No.: 99,253

[22] Filed: Sep. 21, 1987

[51] Int. Cl.$^4$ .................. C08L 11/00; C08L 9/02; C08L 33/26; C08L 63/02

[52] U.S. Cl. ........................ 525/116; 525/119; 525/121; 525/122

[58] Field of Search .............. 525/122, 119, 116, 121

[56] References Cited

U.S. PATENT DOCUMENTS

| | | |
|---|---|---|
| 3,551,471 | 12/1970 | Siebert . |
| 4,232,135 | 11/1980 | Bentley et al. ............... 525/78 |
| 4,515,849 | 5/1985 | Keino et al. ............... 428/201 |
| 4,529,558 | 7/1985 | Melchior ............... 526/262 |
| 4,539,363 | 9/1985 | Backhouse ............... 524/460 |
| 4,562,008 | 12/1985 | Markle et al. ............... 524/555 |
| 4,650,718 | 3/1987 | Simpson et al. ............... 428/414 |
| 4,681,811 | 7/1987 | Simpson et al. ............... 428/413 |

OTHER PUBLICATIONS

F. J. McGarry et al: "Crack Toughened Epoxy Resin Formulations" American Chemical Society, vol. 28 #1, 4/68, 512-525.

F. J. McGarry et al: "Toughening of an Epoxy Resin by an Elastomeric Second Phase" Research Report R68-8, 3/68.

*Primary Examiner*—John C. Bleutge
*Assistant Examiner*—Robert E. L. Sellers
*Attorney, Agent, or Firm*—Wood, Herron & Evans

[57] ABSTRACT

Epoxy and epoxy novolak resins are impact modified by adding an effective amount of an acrylamide diene nitrile rubber terpolymer to the resin. In a preferred embodiment, the acrylamide diene nitrile rubber includes an acid or ester group attached to the acrylamide portion of the polymer generally through a thiol group. The liquid terpolymer is reacted in the presence of acid catalysts with the resin to provide impact modification.

5 Claims, No Drawings

EPOXY RESINS MODIFIED WITH N-R-[(OXY OR THIO)METHYL]ACRYLAMIDE TERPOLYMERS

The usefulness of thermosetting polymers as matrices for reinforced structural composites is seriously limited by their brittleness and susceptibility to crack initiation and propagation. When an epoxy resin is employed as the matrix for a fiberglass reinforced composite, high concentration of internal cracking occurs during cyclic load testing. Once initiated such cracks readily propagate along the fibers in regions of high fiber density.

To inhibit or prevent internal cracking various modifiers have been added to resins. For a number of years thermoplastics such as polyesters and polymethylmethacrylate have been enhanced by the addition of low concentrations of elastomeric polymers as small discrete particles suspended throughout the resin matrix.

Subsequently epoxy resins have been modified by the inclusion of small particles of liquid, butadiene nitrile rubbers, primarily hydroxy, carboxy, amine and vinyl terminated polymers. This work was initially conducted at MIT (see McGarry, F. J. and Sultan, J., "Toughening Mechanisms in Polyester Resins and Composites" R67-66 December 1967 and McGarry, F. J. and Willner, A., "Toughening of an Epoxy Resin by an Elastomeric Second Phase" R68-68 March 1968). This work was primarily conducted with the Hycar brand carboxy terminated butadiene nitrile rubbers (CTBN) and the Hycar CTBNX rubber.

Butadiene nitrile rubbers with carboxyl groups at both ends of the chain, butadiene nitrile rubbers with terminal carboxyl groups as well as intermediate pendent carboxyl groups and butadiene nitrile rubbers which have no carboxyl groups but unsaturated carbon to carbon bonds interspersed along the chain were tested for impact modification of epoxy resins. It was found that only the carboxyl terminated polymers and the butadiene nitrile rubbers with intermediate pendent carboxyl groups provided toughening. See McGarry and Willner, "Crack Toughened Epoxy Resin Formulations" papers presented at the ACS 155th meeting, April 1968 at page 512.

There are of course a wide range of liquid rubbers. As indicated not all of these function as impact modifiers. The noncarboxylated butadiene nitrile rubbers including hydroxy and amine terminated polymers apparently provide limited modifying effect. There are also many examples of hydroxy terminated butadiene nitrile liquid rubbers as for example shown in Siebert U.S. Pat. No. 3,551,471. This is presented by way of example. These have not been shown to be effective epoxy impact modifiers. It has been proposed that only liquid polymers with terminal reactive carboxyl groups provide impact modification.

Another liquid polymer is disclosed in Melchior U.S. Pat. No. 4,529,558 which is assigned to the assignee of the present invention. This patent along with various related patents discloses a liquid heat curable polymer formed from rubber monomers such as isoprene or butadiene, acrylonitrile monomer and a potential acid catalyzed cure site monomer, N-(R-oxymethyl)acrylamide. This is a random terpolymer. It lacks any reactive carboxyl group as well as uniformly positioned reactive terminal groups. It is disclosed that these polymers can be used for preparation of gaskets when coated on a substrate such as metal, paper, cloth, nylon or the like. It is intended to be a solventless liquid heat curable polymer.

SUMMARY OF THE INVENTION

The present invention is premised on the realization that the polymers of the type disclosed in Melchior U.S. Pat. No. 4,529,558 comprising a liquid rubber formed from N-(R oxymethyl) acrylamide, diene, and nitrile effectively impact modify epoxy and epoxy novolak thermoset resins.

The invention is further premised on the realization that further modification is imparted by an effective degree of self reaction of the dispersed rubbery polymer with an acid catalyst prior to cure of the thermoset resin.

Further, substantial improvement of impact modification is obtained where at least some of the acrylamide portion of the polymer includes an acid or ester moiety.

Other advantages of the present invention will be appreciated in light of the following detailed description.

DETAILED DESCRIPTION OF THE INVENTION

According to the present invention epoxy resins or epoxy novolak resins are impact modified by the addition of liquid acrylamide diene nitrile rubber or prepolymer (hereinafter referred to as "ADN").

The ADN is formed by the prepolymerization of a diene (i.e., rubber forming) monomer such as isoprene, chloroprene, butadiene or alkyl esters of acrylic or methacrylic acid, a nitrile monomer such as acrylonitrile or methacrylonitrile and an N-(R-oxymethyl)acrylamide monomer or derivative thereof. The acrylamide monomers have the following general formula:

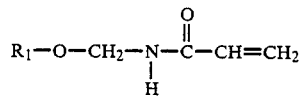

$R_1$ can be $C_3$ to $C_{22}$ alkyl, ether, aldehyde, ketone, amide, ester, carboxylic acid, imide or a phthalimide. N-(R-oxymethyl)acrylamides wherein R represents $C_3$-$C_8$ alkyl are commercially available. $R_1$ must not be a group which will interfere with the chain transfer agent. $R_1$ groups which are non-interfering can be derived from ketones, esters and ethers among others. Interfering $R_1$ groups include those with pendent hydrogens which easily react with a radical such as the tertiary hydrogen in certain alcohols and alkyl amines or thiols.

Specific examples of such N-(R-oxymethyl)acralmides include isobutoxy methylacrylamide and N-hexylcarbatoxy methylacrylamide.

Specifically, $R_1$ can represent a phthalimide, preferably an N-alkyl phthalimide, so that the formed acrylamide monomer would have the following formula:

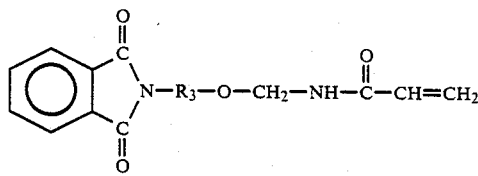

wherein $R_3$ is as $C_1$ to about $C_{10}$ alkyl and preferably has at least two carbon atoms and can optionally possess a pendent carboxyl group.

These more complex N-(R-oxymethyl)acrylamides can be formed by substituting an $R_1$ group of a monohydric alcohol ($R_1OH$) for $R_3$ group in an N-(R-oxymethyl)acrylamide having the general formula:

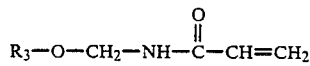

Alternatively N-(R-thiomethyl) acrylamides can be formed by substituting an $R_4$ group of a monohydric thiol ($R_4$—SH) for the $R_3O$ group providing the following monomer:

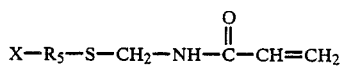

where $R_4$ represents X—$R_5$, where X represents —COOH, —$CH_2$—CH=$CH_2$, or alkyl ester functionality. Generally, $R_5$ should be an alkylene group having from 1 to 8 carbon atoms.

When N-(isobutoxymethyl)acrylamide is used as a starting material, approximately equimolar amounts of that compound and a replacement primary alcohol or monohydric thiol are reacted in the presence of an acid catalyst such as toluene sulfonic acid (for example, 0.5 weight percent based on the acrylamide monomer), at as low a temperature as possible. The isobutyl alcohol formed is vacuum distilled from the reaction mixture until the reaction has gone to completion. In a successful reaction, near theoretical amounts of isobutyl alcohol should be obtained. Excess replacement alcohols or thiols may be required to react all of the amide present to prevent formation of bisacrylamide cross-linking monomers.

The ADN also contains an elasticizing or rubber monomer. These rubber monomers include conjugated diolefins, such as isoprene, chloroprene and butadiene and certain esters of acrylic and methacrylic acid. Specifically, any alkyl ester of acrylic acid having two to ten carbons in the alkyl group, and any alkyl ester of methacrylic acid with four to eight carbons in the alkyl group can be used. The ADN may optionally include 2-5% acrylic acid or methacrylic acid.

Prepolymer ADN Formation

The ADN is prepared by mixing from about 65% to about 71% rubber monomer, about 17–22% acrylonitrile or methacrylonitrile, and from about 7% to about 15% acrylamide as previously defined. In addition, the polymerization formulation should have various other components which are well known to those of ordinary skill in the polymer art. These would include a chain transfer agent, such as t-octyl mercaptan. Other such chain transfer agents include $C_6$–$C_{22}$ tertiary mercaptans. The amounts of rubber monomer, acrylonitrile or methacrylonitrile and acrylamide monomer may be varied to obtain the desired compatibility for the resin being modified.

The prepolymerization occurs in an aqueous emulsion. Suitable emulsifiers include fatty acid soaps and anionic sodium dodecylsulphate and commercially available emulsifiers, such as EMCOL 4910, the sodium salt of an unsymmetrical sulfosuccinate produced by Witco Chemical.

Chelators, such as disodium ethylene diamine tetraacetic acid are also helpful to remove any interfering metal impurities. Other components to initiate reaction or to increase the speed of the reaction would include a redox activator such as ferric chloride hexahydrate, a reducing agent such as sodium formaldehyde sulfoxylate and a free radical initiator. Suitable free radical initiators would include organic peroxides such as tert-butyl hydroperoxide, di-tertbutyl peroxide, cumene hydroperoxide, dicumene peroxide, benzoyl peroxide and the like. Organic peroxygen compounds such as tertbutyl peracetate, tertbutyl perbenzoate, di-tertbutyl perphthalate are also suitable.

Thus, the ADN polymer is formed by combining the rubber monomer, the acrylonitrile or methacrylonitrile, and the acrylamide in the desired proportions within the limits set forth above, together with sufficient chain transfer agent, emulsifier, chelator, activator, reducing agent, free radical initiator and de-ionized air-free water (and optionally acrylic or methacrylic acid). The reactants are mixed and allowed to react for 2–24 hours at about 20° C. by which time yields of about 60–85% are obtained.

The temperature of the reaction should be maintained at less than 40° C., preferably about 20° C. In addition to maintaining the temperature of the reaction within the above limitations, a sufficient amount of a regulator or chain transfer agent must be added to establish the molecular weight of the prepolymer low enough to maintain the desired viscosity. Suitable transfer agents or regulators include n-butyl mercaptan, n-dodecyl mercaptan, t-butyl mercaptan, ethyl thioglycolate, as well as t-octyl mercaptan, the preferred chain transfer agent.

The weight average molecular weight of the ADN should be established between about 10,000 and 30,000, and preferably, between 15,000 and 25,000. The amount of chain transfer agent required will vary depending on the precise monomer used and molecular weight desired, however, this will generally be less than about 5 weight percent based on the total weight of the monomers. The viscosity of the ADN desirably should be less than about 50,000 cps at a mixing temperature of 60° C., or between 90,000 and 150,000 cps at room temperature.

If the ADN is formed from the N-(R-oxymethyl) acrylamide, this prepolymer can be further modified by the addition of a reactive mercapto acid modifier, i.e., $R_4$—SH. Preferably, approximately 3–11 PHR of a mercapto ($C_3$–$C_{10}$) alkylene acid such as mercaptopropionic acid is added to the ADN. The mercapto group should preferentially react with the substituted acrylamide at the alkoxy methylene group under acid catalysis producing pendent carboxylic acid groups on the liquid rubber. This renders the liquid rubber more reactive with the epoxy resins.

Other suitable mercapto modifiers are esters of the mercaptoalkylene carboxylic acid. One particular ester is the tetra ester of pentaerythritol and four moles of mercapto propionic acid.

Both the mercapto group and the acid or ester groups are potentially reactive with the ADN. In fact, these mercapto modifiers can act as crosslinking agents for the ADN. However, the thiol group is substantially more reactive than the acid or ester group. Therefore, the ADN is modified by the mercapto acid or ester by mixing the modifier with the ADN adding an acid catalyst, and heating the mixture to a temperature effective to cause the thiol group to react with the ADN (probably displacing the R—O-group on N-(R-oxymethyl) acrylamide). The reaction conditions are maintained sufficiently mild to enhance the reaction of the thiol group and limit or nearly eliminate the reaction of the carboxyl group.

A ratio of about 0.2/1.0 to 1.0/1.0 of mercapto compound to acrylamide is preferred. Thus an appreciable percentage of the acrylamide moieties in the ADN are usually not reacted. This permits the $R_1$—O-group of the acrylamide where R is phthalimidoethyl, to assist in compatibilizing the liquid prepolymer with epoxy resins.

Preferably the ADN will be formed from the N-alkyl phthalimide in combination with isoprene and acrylonitrile. Specifically, the preferred formulation includes 8–11% N-[(2-phthalimidoethoxy)methyl]acrylamide, 65–71% isoprene and 21–23% acrylonitrile with a number average molecular weight of from about 5,000 to about 12,000.

The ADN is used to modify epoxy resins and epoxy novolak resins. Generally epoxy resins are the family of thermosetting resins containing the oxirane structure which is a three membered ring containing two carbon atoms and one oxygen atom. Originally, these were made by condensing epichlorohydrin and Bisphenol-A. Epoxy resins are generally formed now from low molecular weight diglycidyl ethers of Bisphenol-A and modifications thereof. Another type is formed by the oxidation of olefins with peracetic acid. Depending on molecular weight the resins range from liquids to solid resins. The present invention is limited to those which are liquid at less than 20° C.

Epoxy-novolak resins are two step resins formed by reacting epichlorohydrin with phenol formaldehyde condensates. They are also defined as linear thermoplastic B-stage phenolic resins that are in a partial stage of cure. The epoxy-novolaks may have up to seven or more epoxy groups per molecule.

Brand name resins include Epon 828, Epon 830, Epon 34, Dow DER 331, Epi-Rez 510, Epotuf 37–140 and Gen Epoxy 190.

For impact modifications, the ADN is mixed with the resin and prereacted to form partially prereacted ADN epoxy or epoxy novolak adduct concentrates which can then be cured with standard curing agents.

Accordingly, 5–10 phr of the ADN is mixed with a strong acid catalyst such as para-toluene sulfonic acid or Alkaphos 3 (phosphoric acid partial ester) and heated to about 300° F. (150° C.) (0.5–5 weight percent acid on liquid rubber), while stirring over a 5–15 minute period. Then sufficient resin is added to produce a 20–40 weight percent solution of the ADN in resin. This solution is further heated for 5–15 minutes at 300°–400° F. (150°–205° C.). This provides a clear stable ADN resin adduct which for use is mixed with additional resin to form an ADN content of 5–15 weight percent. The resin is then cured using standard curing mechanisms.

To evaluate the present invention, epoxy resins were cured and tested in various ways. Certain physical data are set forth in the tables.

Experiments 1, 5 and 9 represent unmodified Epon 828 cured with piperidine at 120° C. Experiments 2, 6, 10 and 11 demonstrate the use of prior art Kellogg Kelpoxy 293-100 in Epon 828 acting as controls. Experiments 3, 4, 7, 8 and 12–16 and 18 represent the use of the novel liquid prepolymer in Epon 828.

The chemical composition of the ADN was approximately as follows: isoprene 65%, acrylonitrile 21, HPMA 9%, isobutoxymethylacrylamide 3% and acrylamide 2%. The isobutoxymethylacrylamide and acrylamide are by products of the HPMA formation reaction. These ADN's have a number average molecular weight of from 6,000 to 9,000.

The compositions shown in tables 1 and 2 include 24 parts by weight Bisphenol A in Epon 828. This is reported to produce a bimodal distribution of phase dispersed particles of approximately 0.2–1.0 microns and 2 to 5 micron particles using Hycar 1300X8 liquid rubber products. The compositions in table 3 do not contain Bisphenol A and represent a more direct comparison of the relative efficacy of equal parts by weight of Hycar 1300X8 and the ADN of the present invention. It is also pertinent that the control compositions 2 and 6 are replicates which contain 22 parts by weight Hycar brand liquid rubber based on epoxy resin while the experimental compositions 3, 4, 7 and 8 contain 10 parts by weight. Hence 2 and 6 would be expected to show dart impact strengths that are substantially greater than the values for experiments 3, 4, 7 and 8. The two values are in fact different by 30% and are lower than the blanks.

The samples listed in Table 1 were tested according to the Gardner test procedure. The specimen size was 2.5 inch by 0.5 inch by 0.125 inches (6.357 cm × 1.27 cm × 0.3175 cm). The specimens were conditioned 48 hours at 70° F. and 50% relative humidity and tested under these conditions. The epoxy compositions were cured in a 6.5 inch by 6.5 inch Teflon coated pan for 16 hours at 120° C. in an air circulating oven to form 6.5 inch by 6.5 inch by 0.125 inch slabs which were cut into test pieces using a band saw. The results are the average from 10 test specimens.

TABLE 1

Falling Dart Impact Test of Cured Liquid Rubber Modified Epoxy Resin

| Number | Experiment Type | Fracture Impact in lb |
|---|---|---|
| 1 | Blank, no liquid rubber[a] | 12.7 |
| 2 | Control, commercial liquid rubber[b] | 9.8 |
| 3 | ADN liquid rubber[c] | 12.2 |
| 4 | ADN liquid rubber[d] with polythiol additive | 14.9 |

[a]Epon 828-180.0 g, Bisphenol A-19.2 g, piperidine 4.0 g.
[b]Epon 828-96.0 g, Bisphenol A-38.4 g, Kellogg-293-100 = 80 g, piperidine-8.0 g.
[c]Epon 828-80.0 g, Bisphenol A-19.2 g, ADN Liquid Rubber 89-8.0 g, piperidine-4.0 g, Alkaril Chemicals Alkaphos 3-0.20 g.
[d]Epon 828-80.0 g, Bisphenol A-19.2 g, ADN 89-8.0 g, piperidine-4.0 g, Cincinnati Milacron Q-43 = 0.40 g, Alkaphos 3-0.20 g.

According to table 2, the samples were tested by falling dart impact method. The sample preparations were the same.

TABLE 2

Falling Dart Impact Test of Cured Liquid Rubber Modified Epoxy Resin

| Number | Experiment Type | Fracture Impact in lb |
|---|---|---|
| 5 | Blank, no liquid rubber[a] | 13.4 |
| 6 | Control, commercial liquid rubber[b] | 12.9 |
| 7 | ADN liquid rubber[c] | 12.4 |

TABLE 2-continued

Falling Dart Impact Test of Cured Liquid Rubber Modified Epoxy Resin

| Number | Experiment Type | Fracture Impact in lb |
|---|---|---|
| 8 | ADN liquid rubber(d) | 14.7 |

(a)Epon 828-80.0 g, Bisphenol A-19.2 g, piperidine-4.0 g.
(b)Epon 828-48.0 g, Bisphenol A-19.2 g, Kellogg 293-100 = 40.0 g, piperidine-4.0 g.
(c)Epon 828-80.0 g, Bisphenol A-19.2 g, ADN 28-02 = 8.0 g, piperidine-4.0 g, Alkaphos 0.20 g.
(d)Epon 828-80.0 g, Bisphenol A-19.2 g, 8.0 g, piperidine-4.0 g, Q43-0.40 g, Alkaphos 3-0.20 g.

The examples shown in table 3 were prepared by the Gardner test procedure with disc specimens of 1.33 inches diameter by 0.25 inch thickness. These specimens were conditioned for 48 hours at 70° F. at 50% humidity and tested under these conditions. The epoxy compositions were cured in a 12 cavity Teflon coated, open mold with 1.33 inch diameter cavities for 16 hours at 120° C. or using a staged cycle cure 1 hour at 80° C., 1 hour at 100° C., 16 hours at 120° C. Unless otherwise indicated, the 16 hour at 120° C. cycle was used. The results again are the average of 10 to 12 test specimens.

In examples 13–19 the ADN was modified with the thiol acid or ester listed and then added to the epoxy resin. In these examples, the ADN was combined with a strong acid catalyst generally paratoluene sulfonic acid dissolved in alcohol. Cycat 4040 is 40% paratoluene sulfonic acid in isopropyl alcohol. This is mixed with the ADN at about 250°–300° F. for about 1–2 minutes. The alcohol is allowed to evaporate off and the acid catalyst ADN mixture is cooled to about room temperature.

The thiol ester or acid is then added to this mixture and this mixture is heated to about 325° F. for about 8 minutes and cooled. The modified ADN is then added to the epoxy resin as indicated.

TABLE 3

Falling Dart Impact Test of Cured Liquid Rubber Modified Epoxy Resin

| Number | Experiment Type | Fracture Impact in lb |
|---|---|---|
| 9 | Blank, no liquid rubber(a) | 49 |
| 10 | Control, commercial liquid rubber(b) | 58 |
| 11 | Control, commercial liquid rubber(c) | 55 |
| 12 | ADN liquid rubber(d) | 45 |
| 13 | ADN liquid rubber-0.42 percent polythiol adduct(e) | 52 |
| 14 | ADN liquid rubber-0.47 percent mercaptopropionic acid adduct(f) | 57 |
| 15 | ADN liquid rubber-0.95 percent mercaptopropionic acid adduct(g) | 63 |
| 16 | ADN liquid rubber-1.43 percent mercaptopropionic acid adduct(h) | 61 |
| 17 | Control, commercial liquid rubber with 0.95 percent mercaptopropionic acid(i) | 50 |
| 18 | ADN liquid rubber-0.95 percent mercaptopropionic acid adduct(j) | 63 |
| 19 | ADN liquid(k) rubber-0.95 percent mercaptopropionic acid adduct, UV activated | 58 |

(a)Epon 828-100.00 g, piperidine-5.00 g.
(b)Epon 828-67.80 g, Kellogg 293-100-32.80 g, piperidine = 4.38 g.
(c)Same as (b), but cured in stages.
(d)Epon 828-87.50 g, ADN-13.13 g, p-toluene sulfonic acid-0.26 g, piperidine-4.38 g, staged cured.
(e)Same as (d), but with 0.44 g Cincinnati Milacron Q43, staged cured.
(f)Same as (d), but with 0.66 g American Cynamid Cycat 4040 used in place of p-toluene sulfonic acid and with staged cure.
(g)Same as (f), but with 1.00 g mercaptopropionic acid, staged cure.
(h)Same as (f), but with 1.50 g mercaptopropionic acid, staged cure.
(i)Epon 828-87.50 g, Hycar 1300X8-13.13 g, Cycat 4040-0.66 g, piperidine-4.38 g, mercaptopropionic acid-1.00 g.
(j)Same as (f), but with 0.92 g Alkaril Chemicals Alkaphos 3 used in place of Cycat 4040.
(k)Same as (g), except the 1.00 g mercaptopropionic acid was reacted with the liquid rubber and the cure was promoted by adding 0.29 g benzophenone in place of 0.66 g of Cycat 4040 and exposing the reaction mixture to the radiation from a 275 watt GE sunlamp at a distance of only 0.5–1.0 inch from the lamp in the open air for 30 minutes with hand mixing every 2 or 3 minutes. The clear light straw colored mixture turned a golden yellow, became too hot to touch and increased noticeably in viscosity at room temperature.

As can be seen, the ADN generally provides comparable results to the Hycar liquid rubber when simply added with the epoxy resin and cured with an acid catalyst.

It is notable that in the above samples, although the Hycar did not form a true solution with the epoxy resin upon addition, the ADN actually did appear to go into solution when initially mixed and maintained under agitation. Only when the acid catalyzed cure or heat catalyzed cure occurred did the ADN or mercapto modified ADN come out of solution to form discrete particles which appear to be necessary for impact modification.

Accordingly, the present invention provides both for the impact modification of epoxy resins and epoxy novolak resins. Th above description has been intended to be both a description of the present invention as well as the best mode to practicing the present invention.

However, applicant intends to be bound only by the appended claims in which I claim:

1. An impact modified thermoset resin composition, said resin selected from the group consisting of epoxy resins and epoxy novolak resins, comprising:
said thermoset resin and an N-(R-thiomethyl) acrylamide-nitrile random terpolymer which is dispersible in said resin at about less than 30° C., said N-(R-thiomethyl) acrylamide-nitrile terpolymer provided in an amount effective to provide impact modification of said thermosetting resin, wherein said terpolymer is the reaction product of N-(R-thiomethyl) acrylamide, a rubber formable monomer selected from the group consisting of isoprene, butadiene, alkyl esters of acrylic acid, alkyl esters of methacrylic acid and chloroprene, and a nitrile monomer selected from the group consisting of acrylonitrile and methacrylonitrile.

2. The composition of claim 1 wherein said terpolymer comprises from 65 to 75% of rubber formable monomers, from 20 to 30% of nitrile and from 4 to 10% of N-(R-thiomethyl) acrylamide.

3. The composition claimed in claim 2 wherein said terpolymer has a number average molecular weight less than about 12,000.

4. The composition claimed in claim 1 wherein said amount effective to provide impact modification comprises from about 3 to about 50%.

5. The composition of claim 1 wherein said N-(R-thiomethyl)acrylamide is selected from the group consisting of mercapto acid modified derivatives of N-hexylcarbatoxy methylacrylamide, isobutoxy methyl acrylamide and N-[(2-phthalimidoethoxy)methyl]acrylamide.

* * * * *